United States Patent [19]

Nagura

[11] Patent Number: 5,025,318
[45] Date of Patent: Jun. 18, 1991

[54] IMAGING APPARATUS WITH MEANS FOR CANCELLING DIFFERENTIAL OFFSET VOLTAGE

[75] Inventor: Riichi Nagura, Tokyo, Japan

[73] Assignee: NEC Corporation, Tokyo, Japan

[21] Appl. No.: 457,901

[22] Filed: Dec. 27, 1989

[30] Foreign Application Priority Data

Dec. 27, 1988 [JP] Japan ................................ 63-334826

[51] Int. Cl.$^5$ ...................... H04N 3/14; H04N 5/335; H04N 5/213
[52] U.S. Cl. ................................ 358/213.15; 358/167; 358/213.29
[58] Field of Search ............. 358/213.15, 167, 213.29, 358/213.16

[56] References Cited

U.S. PATENT DOCUMENTS 4,307,423 12/1981 Atherton ....................... 358/213.15
4,710,816 12/1987 Yabumoto ..................... 358/213.15

Primary Examiner—Howard W. Britton
Assistant Examiner—Wendy R. Greening
Attorney, Agent, or Firm—Sughrue, Mion, Zinn, Macpeak & Seas

[57] ABSTRACT

In an imaging apparatus, bipolar clock pulses are generated for driving the odd-and-even-number second shift registers of a linear charge transfer device. A voltage representing the difference between offset voltages generated respectively by the shift registers is generated by a band-pass filter or a differential circuit and multiplied with the bipolar clock pulses to produce a varying voltage of a particular polarity determined by the relative value of the offset voltages. The varying voltage is smoothed into a DC voltage by a low-pass filter. The DC voltage of appropriate polarity is combined with one of the output signals of the shift registers so that the difference between the offset voltages substantially reduces to zero through a feedback loop.

18 Claims, 8 Drawing Sheets

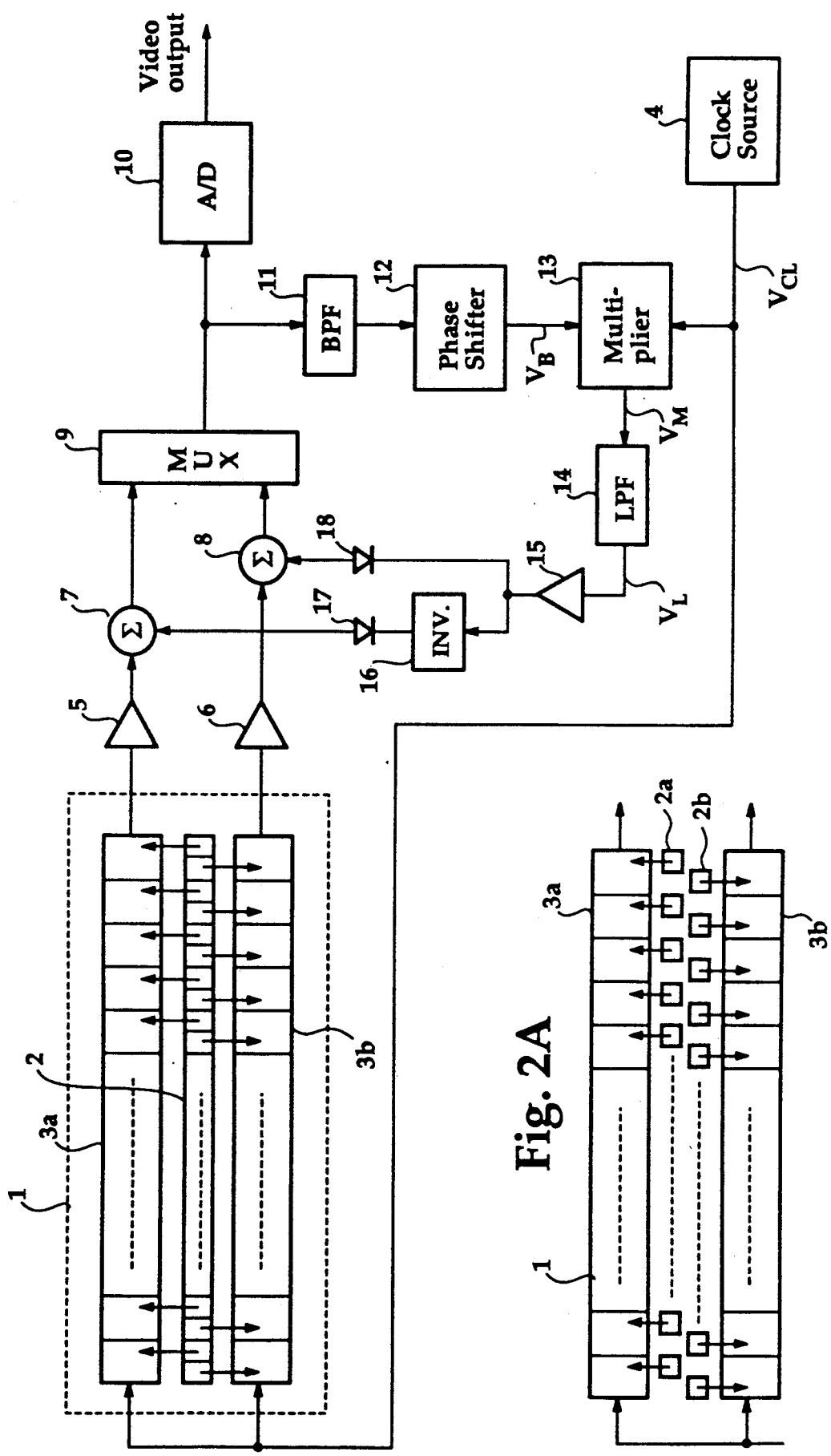

IMAGING APPARATUS WITH MEANS FOR CANCELLING DIFFERENTIAL OFFSET VOLTAGE

BACKGROUND OF THE INVENTION

The present invention relates generally to image sensing apparatus, and more specifically to a difference voltage canceller for cancelling the difference between offset voltages respectively developed by analog shift registers of a charge transfer device.

Linear charge-coupled devices having several thousands of picture resolution elements are used in a satellite earth observation system that scans over a wide area of the earth surfaces to obtain high definition images. For the purpose of reducing the loss of signal intensity of charges generated by elements remote from the device output, two analog shift registers are provided, one for the odd-numbered resolution elements and the other for the even-numbered elements. In such linear CCD applications, the transfer speed of the charges, or clock frequency is determined in relation to the moving speed of the object relative to the imaging device. In addition to the attenuation problem, the outputs of the analog shift registers contain undesired offset voltages which may vary due to device variabilities as well as with operating temperature and other ambient conditions.

This situation will be explained in detail with reference to FIG. 1. $V_{00}$ represents typical light intensities at different photosensitive elements of a CCD, which are alternately transferred by the odd- and even-number shift registers as an odd-numbered video output $V_O$ and an even-numbered video output $V_E$. The odd-numbered video output $V_O$ is a sum of the odd-numbered components of video signal $V_{00}$ and an offset component $V_1$, while the even-numbered video output $V_E$ is a sum of the even-numbered components of the video signal $V_{00}$ and an offset voltage component $V_2$. By multiplexing the outputs of the analog shift registers into a time-sequential signal $V_C$, the DC offset voltage components $V_1$ and $V_2$ are alternately chopped into voltage pulses. Since the voltage difference between the offset components $V_1$ and $V_2$ is very small, it is not critical for most applications. However, when imaging a wide area of uniform light intensity such as ocean waters, such voltage differences becomes noticeable and appears as a series of stripes. Such stripes cannot be eliminated precisely from a signal received at the earth station due to limited quantization levels of the satellite.

SUMMARY OF THE INVENTION

It is therefore an object of the present invention to eliminate the stripe pattern by reducing the difference between offset voltages developed by odd- and even-number analog shift registers of a charge transfer device.

According to the present invention, bipolar clock pulses are generated for driving the first and second shift registers of a charge transfer device. A voltage representing the difference between the offset voltages of the shift registers is generated by a band-pass filter or a differential circuit and multiplied with the bipolar clock pulses to produce a voltage of variable polarity depending on the relative value of the offset voltages. The variable polarity voltage is filtered, and a DC voltage of appropriate polarity is combined with one of the output signals of the shift registers so that the difference between the offset voltages substantially reduces to zero.

BRIEF DESCRIPTION OF THE DRAWINGS

The present invention will be described in further detail with reference to the accompanying drawings, in which:

FIG. 2 is a block diagram of an image sensing apparatus according to a first embodiment of the present invention, and FIG. 2A shows a charge-coupled device with a nonlinear photosensor;

DETAILED DESCRIPTION

Figure 1:
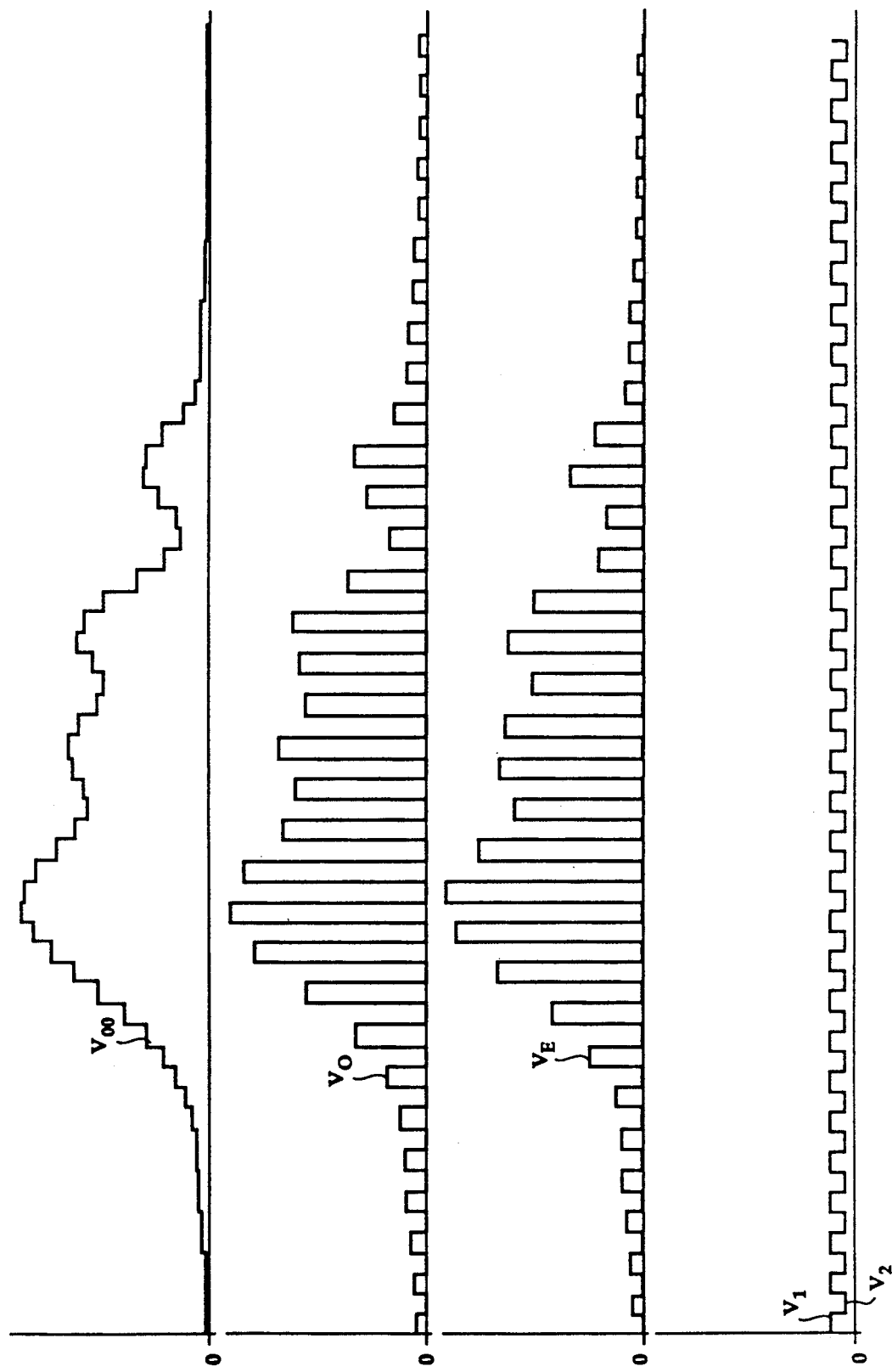
FIG. 1 is a waveform diagram showing voltages generated in a conventional charge-coupled device.

Referring now to FIG. 2, there is shown a CCD (charge-coupled device) imaging apparatus according to one embodiment of the present invention. The imaging apparatus includes a charge-coupled device 1 which consists of a photosensor array 2 which may either be of a linear type as shown in FIG. 2 or of a nonlinear type as shown at 2a, 2b in FIG. 2A, an "odd-number" analog shift register 3a and an "even-number" analog shift register 3b. The stages of "odd-number" analog shift register 3a are connected respectively to the odd-numbered photosensitive elements, or pixels of the photosensor 2 and those of "even-number" analog shift register 3b are connected respectively to the even-numbered photosensitive elements of the photosensor 2. Photogenerated charges in the odd-numbered elements of the photosensor 2 are extracted by analog shift register 3a and those generated in the even-numbered elements are extracted by analog shift register 3b. Shift registers 3a and 3b are driven by the same clock pulse of bipolar waveform supplied from a clock source 4. Photogenerated charges in the odd-numbered elements are sequentially transferred along the shift register 3a and appear as a series of odd-numbered video pulses of positive varying amplitude at the input of an amplifier 5 and those in the even-numbered elements are sequentially transferred along the shift register 3b and likewise appear as a second series of even-numbered pulses of positive varying amplitude at the input of an amplifier 6. Therefore, the video pulses from the odd-number shift register 3a are time-coincident with the positive components of the clock pulses, and those from the even-number shift register 3b are coincident with the negative components of the clock pulses.

The outputs of amplifiers 5 and 6 are coupled to summing amplifiers 7 and 8, respectively, to which an offset trimming voltage of negative polarity is applied from a diode 17 or 18 depending on the relative value of the offset components of the signals at the outputs of amplifiers 5 and 6. The outputs of summing amplifiers 7 and 8 are combined in a multiplexer 9 to produce a composite sequence of odd- and even-numbered video pulses which appear at the input of an analog-to-digital converter 10 for digital conversion.

The output of multiplexer 9 is coupled to a feedback control circuit including a band-pass filter 11 having a passband centered at the repetition frequency of the video pulses to produce a sinusoidal wave. Since the video pulses are synchronized with the clock pulse, the output of band-pass filter 11 is at the same frequency as the repetition frequency of the clock pulses.

Figure 3A:
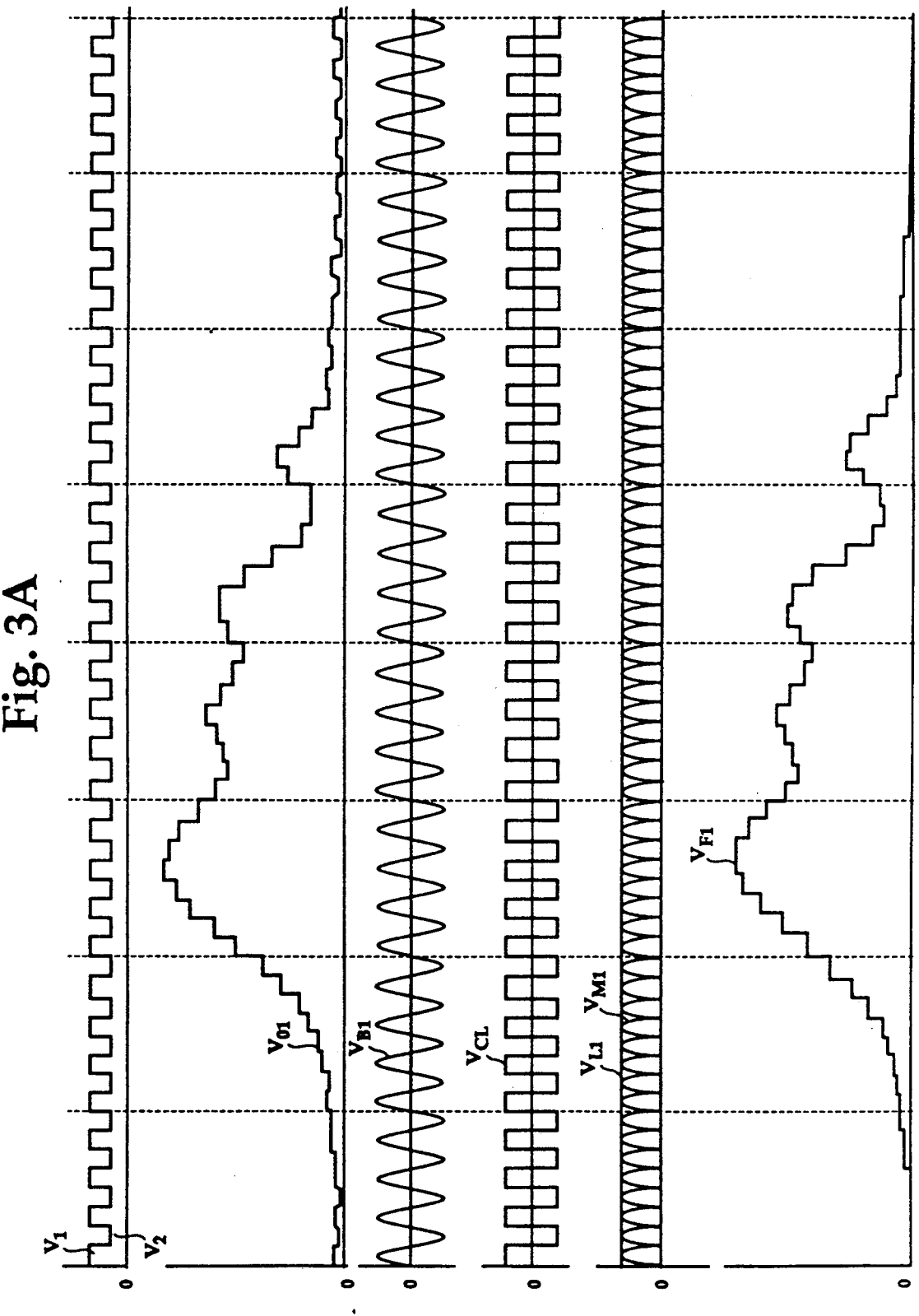
FIGS. 3A and 3B are waveform diagrams associated with the embodiment of FIG. 2, with FIG. 3A showing voltages developed when the offset voltage of the odd-number shift register of the CCD is higher than the offset voltage of the even-number shift register, and FIG. 3B showing voltages developed when the offset voltage of the odd-number shift register is lower than the offset voltage of the even-number shift register.
Figure 3B:
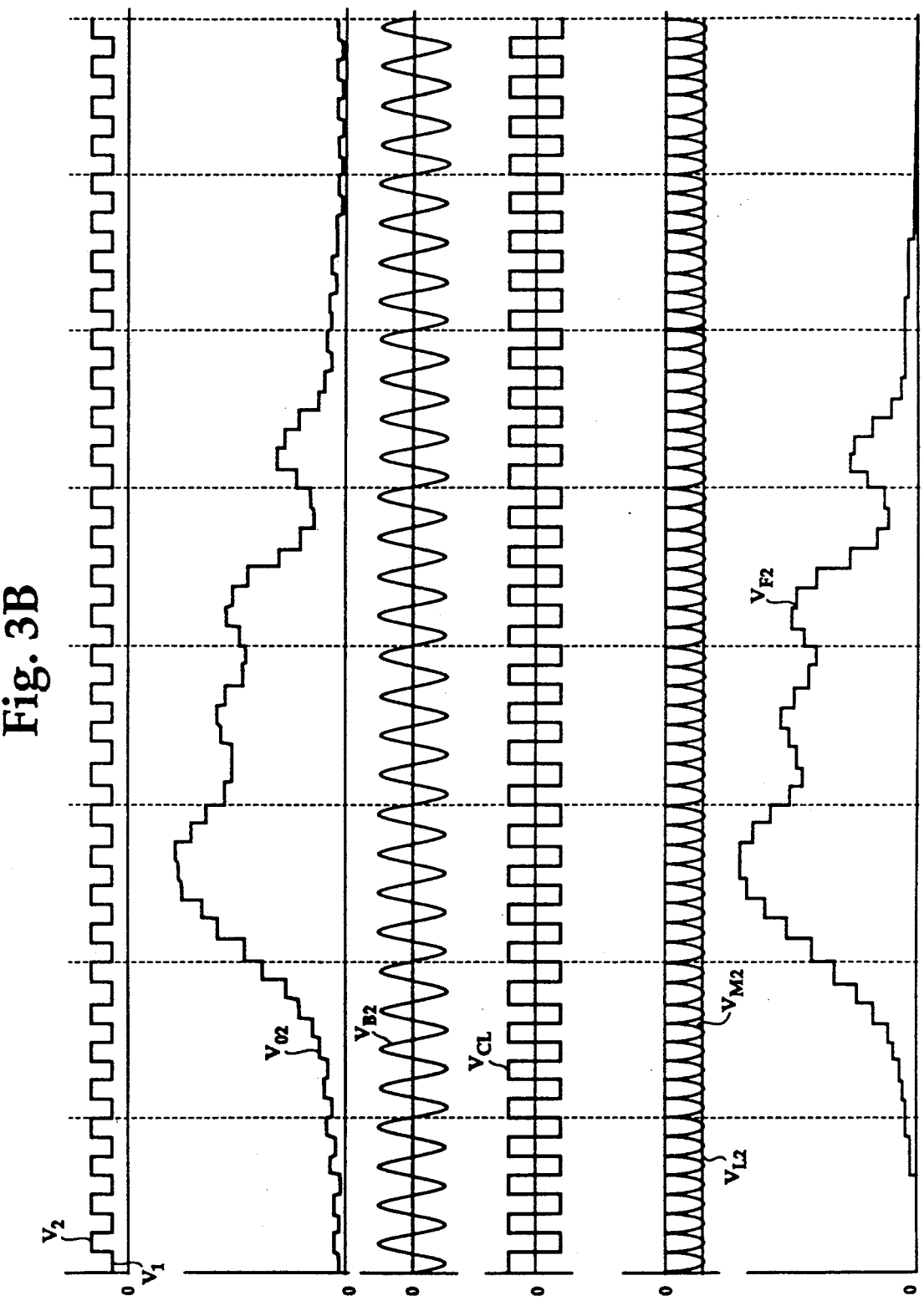

In FIG. 3A, the output of odd-number shift register 3a is shown as containing a higher offset voltage $V_1$ and the output of even-number shift register 3b is shown as containing a lower offset voltage $V_2$. If these offset voltages are superimposed on a video signal, an offset-containing video output $V_{O1}$ will be produced at the output of multiplexer 9 and an alternating voltage $V_{B1}$ will appear at the output of band-pass filter 11. In FIG. 3B, the outputs of odd-number shift registers 3a and 3b are shown as containing a higher offset voltage $V_1$ and a lower offset voltage $V_2$, respectively. If these offset voltages are superimposed on a video signal, an offset-containing video signal $V_{O2}$ will be produced at the output of multiplexer 9 and an alternating voltage $V_{B2}$ will appear at the output of band-pass filter 11.

The amplitude of alternating voltages $V_{B1}$ and $V_{B2}$ represents the difference between the offset voltages $V_1$ and $V_2$, and their phase relationship to the clock timing indicates which one of the offset voltages is higher. If $V_1$ is higher than $V_2$ as shown in FIG. 3A, voltage $V_{B1}$ of FIG. 3A will be advanced by 180° with respect to voltage $V_{B2}$ of FIG. 3B.

The output of band-pass filter 11 is applied to a phase shifter 12, where the phase of the output of band-pass filter 11 is manually adjusted so that, if $V_1$ is higher than $V_2$, the positive and negative components of alternating voltage $V_{B1}$ respectively coincide with the positive and negative components of the clock signal $V_{CL}$. Conversely, if $V_1$ is lower than $V_2$, the positive and negative components of alternating voltage $V_{B2}$ respectively coincide with the negative and positive clock components. A multiplier 13 is provided to multiply two input waveforms, one from the phase-adjusted output of band-pass filter 11 and the other from clock source 4. The multiplication results in the generation of a series of positive sinusoidal halfwave pulses $V_{M1}$ (see FIG. 3A) if $V_1$ is higher than $V_2$ or a series of negative sinusoidal halfwave pulses $V_{M2}$ (see FIG. 3B) if $V_1$ is lower than $V_2$.

The output of multiplier 13 is applied to a low-pass filter 14. By the low-pass filtering action of filter 14, the sinusoidal halfwave pulses $V_M$ from multiplier 13 are smoothed into a DC voltage $V_L$ of either positive or negative polarity, which is amplified by a linear amplifier 15. The output of amplifier 15 is supplied through a unity-gain inverting amplifier 16 to the cathode of diode 17 on the one hand, and supplied direct to the cathode of diode 18 on the other. If the output of amplifier 15 is of positive polarity, the positive DC voltage will be reversed in polarity by inverting amplifier 16 and passed through diode 17 to summing amplifier 7, and if negative, it will be passed through diode 18 to summing amplifier 8.

Therefore, a negative feedback loop is established between the output of multiplexer 9 and the inputs of summing amplifiers 7 and 8 to feed back a trimming voltage of negative polarity at one of the inputs of summing amplifiers 7 and 8, depending on the relative value of the offset voltages. If $V_1$ is higher than $V_2$, the trimming voltage is supplied to summing amplifier 7 and acts on each odd-numbered positive video pulse from shift register 3a to reduce its amplifier so that the difference between $V_1$ and $V_2$ is substantially reduced to zero, producing an offset-free video output $V_{F1}$ at the input of A/D converter 10. If $V_1$ is lower than $V_2$, the trimming voltage is supplied to summing amplifier 8 and acts on each even-numbered positive video pulse from the shift register 3b to reduce the difference between $V_1$ and $V_2$ to zero, producing an offset-free video output $V_{F2}$ at the input of A/D converter 10.

Figure 4:
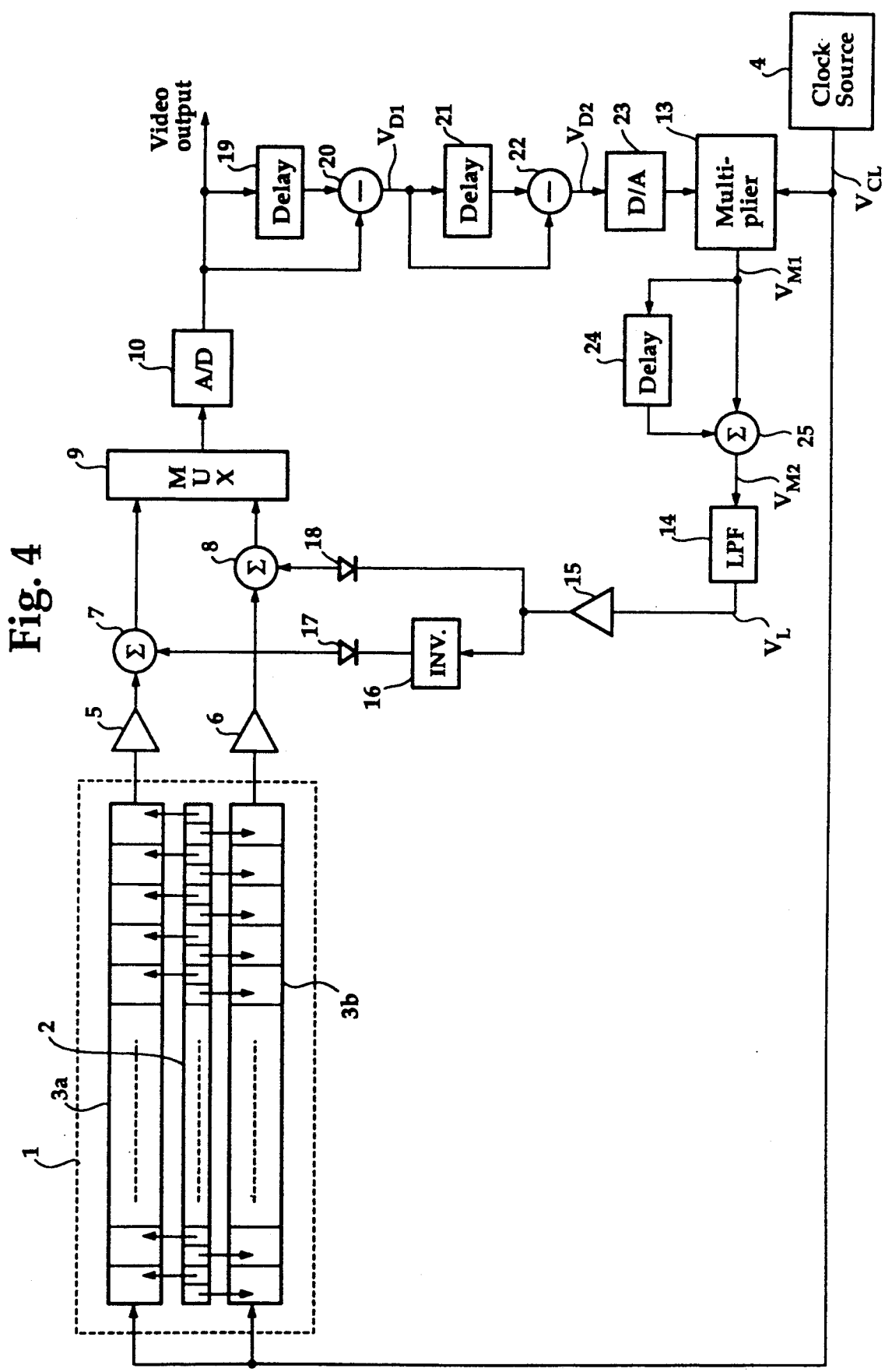
FIG. 4 is a block diagram of an image sensing apparatus according to a second embodiment of the present invention.

A modified embodiment of the invention is shown in FIG. 4 in which parts corresponding to those in FIG. 2 are marked with the same numerals as used in FIG. 2. In this embodiment, the band-pass filter 11 and phase shifter 12 of FIG. 2 are replaced with 1-pixel digital delay lines or shift registers 19, 21 and digital subtractors 20 and 22 to derive a feedback signal from the output of A/D converter 10, rather than from the output of multiplexer 9. The use of the digital circuitry is advantageous for precisely determining the delay times. Digital delay line 19 delays the output of A/D converter 10 by one-pixel interval. The difference between the delayed and nondelayed outputs of A/D converter 10 is detected by digital subtractor 20 to produce a first differential signal $V_{D1}$, which is passed through the second delay line 21 to the second digital subtractor 22 to which the output of the first subtractor 20 is also applied. A second differential signal $V_{D2}$ appears at the input of a digital-to-analog converter 23 for coupling an analog version of the second digital differential signal to the multiplier 13 where the analog differential voltage is multiplied with the clock pulses to produce a product signal $V_{M1}$. To increase the DC component of the signal $V_{M1}$, the output of multiplier 13 is applied through an analog delay line 24 to a summing amplifier 25 where it is combined with the nondelayed output of multiplier 13, producing an output $V_{M2}$. The output of summing amplifier 25 is filtered by the low-pass filter 14 into a DC signal $V_L$ proportional to the difference between offset voltages $V_1$ and $V_2$ and supplied to the linear amplifier 15 as a positive or negative trimming voltage.

Figure 5A:
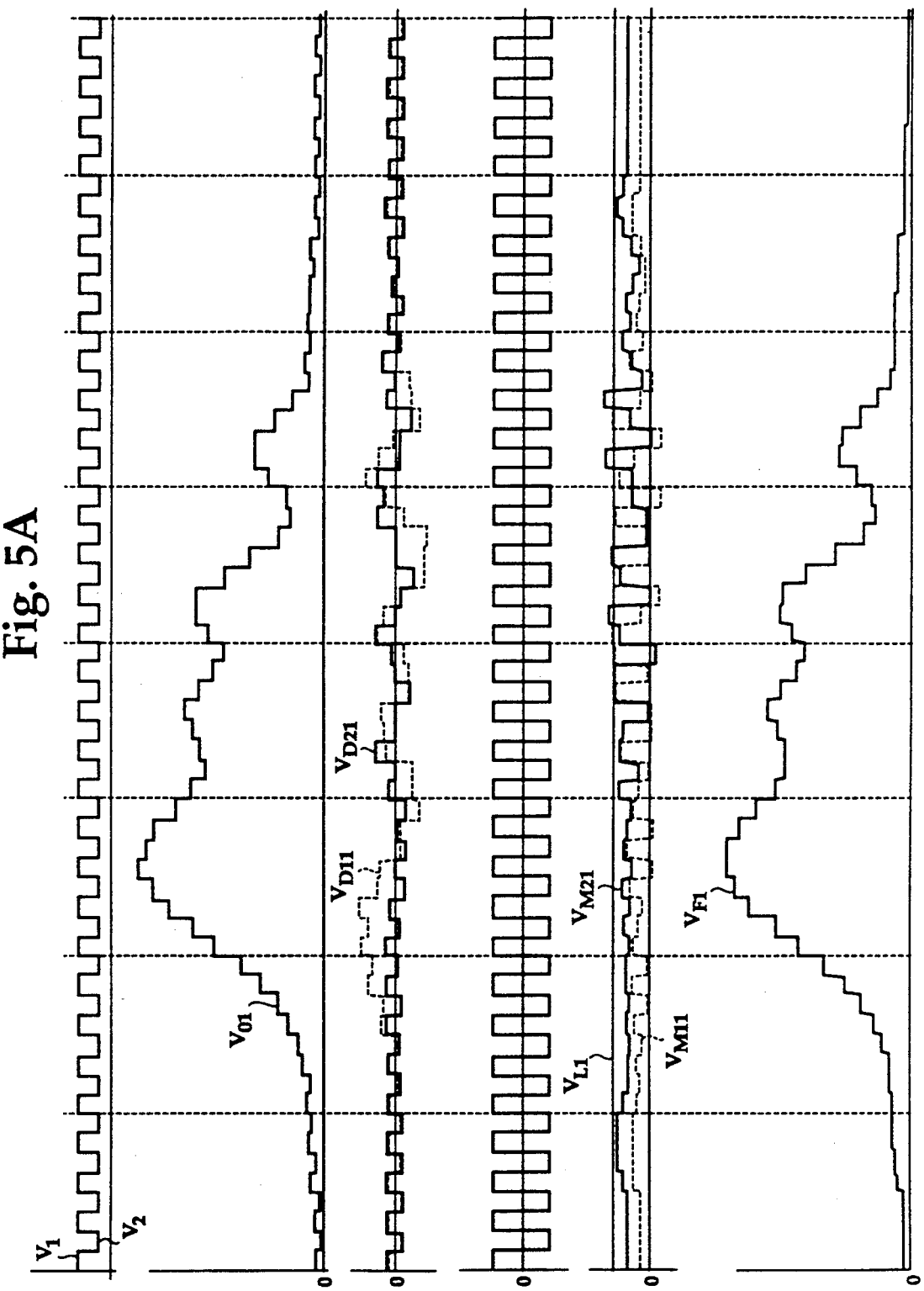
FIGS. 5A and 5B are waveform diagrams associated with the embodiment of FIG. 4, with FIG. 5A showing voltages developed when the offset voltage of the odd-number shift register is higher than the offset voltage of the even-number shift register, and FIG. 5B showing voltages developed when the offset voltage of the odd-number shift register is lower than the offset voltage of the even-number shift register.

As shown in FIG. 5A, if the offset voltage $V_1$ is higher than the offset voltage $V_2$, the analog version of the first differential signal $V_{D1}$ will appear as a dotted-line waveform $V_{D11}$ and the analog version of the second differential signal $V_{D2}$ will appear as a solid-line waveform $V_{D21}$. The multiplication with the clock pulses $V_{CL}$ results in a dotted-line waveform $V_{M11}$ at the output of multiplier 13 and the delay-and-sum action produces a waveform $V_{M21}$ of high DC content at the output of summing amplifier 25. The low-pass filtering action of filter 14 produces a positive DC voltage $V_{L1}$ at the input of amplifier 15, which is inverted to negative voltage by inverter 16 and applied through diode 17 to summing amplifier 7.

Figure 5B:
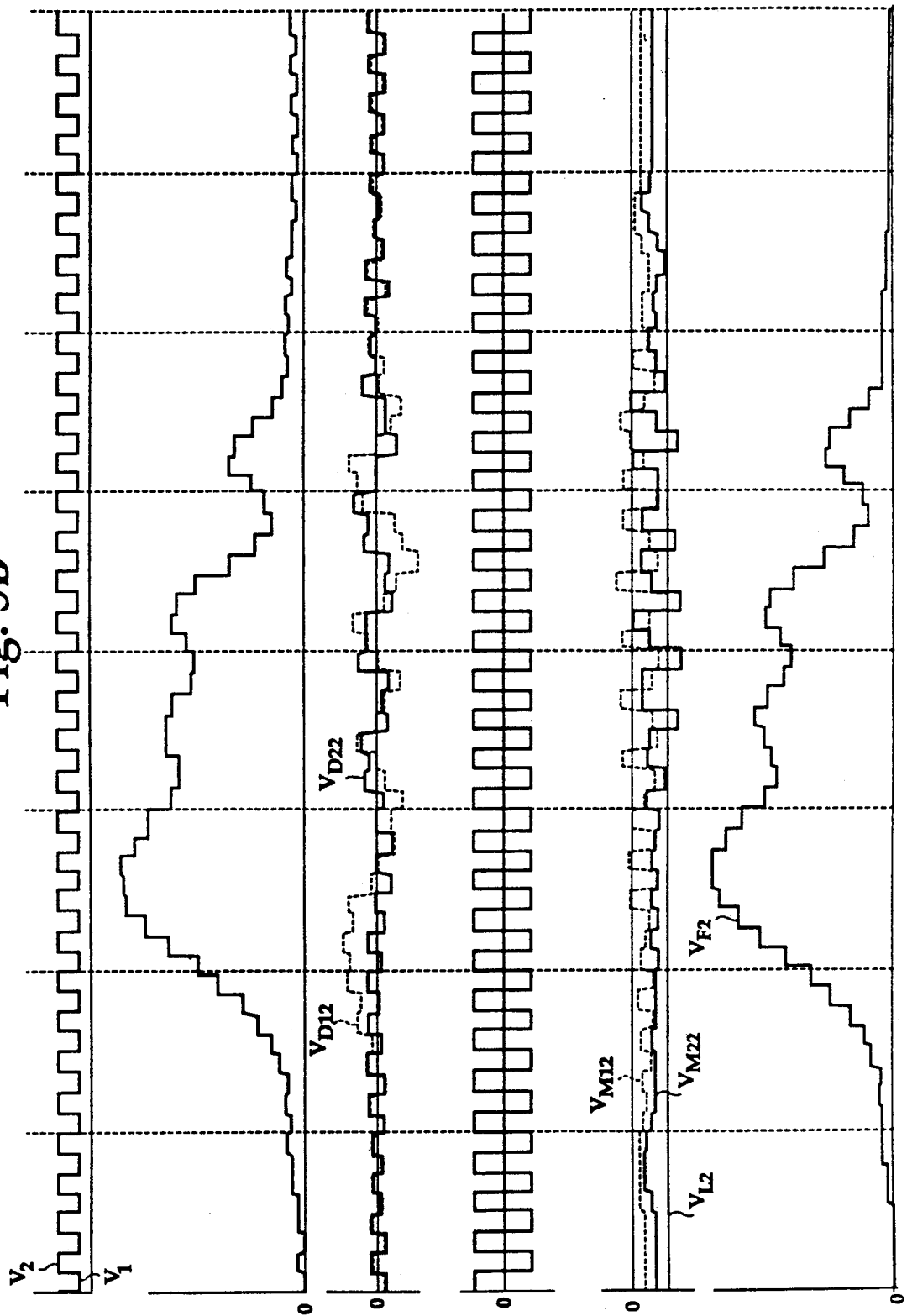

If voltage $V_1$ is lower than $V_2$ as shown in FIG. 5B, the analog version of the first differential signal $V_{D1}$ will appear as a dotted-line waveform $V_{D12}$ and the analog version of the second differential signal $V_{D2}$ will appear as a solid-line waveform $V_{D22}$. The multiplication with the clock pulses $V_{CL}$ results in a dotted-line waveform $V_{M12}$ at the output of multiplier 13 and the delay-and-sum action produces a waveform $V_{M22}$ of high DC content at the output of summing amplifier 25. The low-pass filtering action of filter 14 produces a negative DC voltage $V_{L2}$ at the input of amplifier 15, which is passed through diode 18 to summing amplifier 8.

Figure 6:
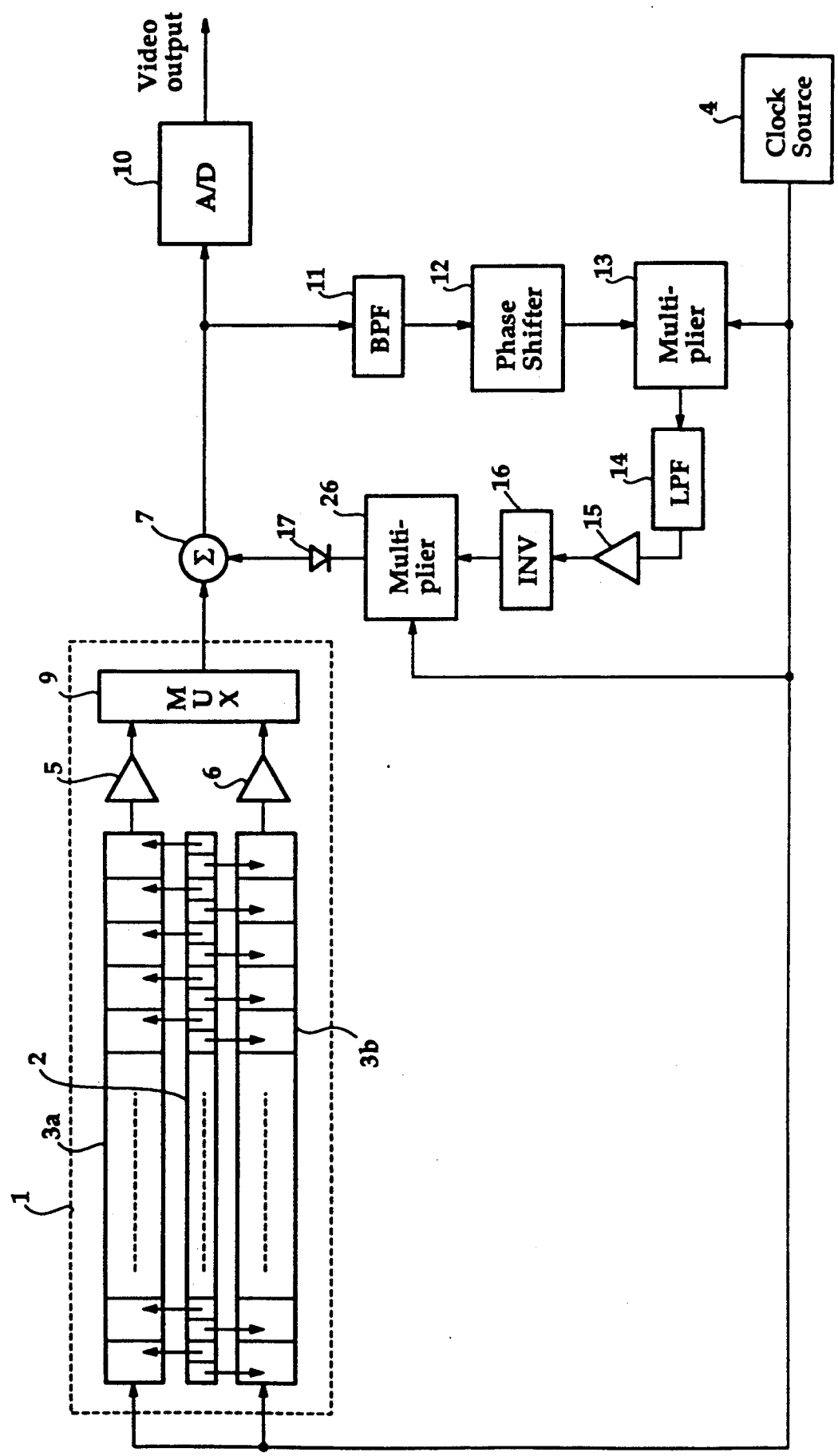
FIG. 6 is a block diagram of an image sensing apparatus according to a third embodiment of the present invention.

FIG. 6 is an illustration of a further modification of the present invention which is useful for a charge-coupled device 1A in which amplifiers 5, 6 and multiplexer 9 are provided and therefore wiring access to these internal circuits is not practical. The feedback circuit of this embodiment is similar to the FIG. 2 embodiment except that it replaces the diode 18 and summing amplifier 8 of FIG. 2 with a multiplier 26 which multiplies the output of amplifier 15 with the clock pulses. Since the positive and negative pulses of the clock are respectively synchronized with the outputs of the odd- and even-number shift registers 3a and 3b, multiplication of the positive pulses of the clock with the negative voltage output of inverter 16 which is generated when $V_1 > V_2$ produces a series of negative voltage pulses synchronized with the output of odd-number shift register 3a, and multiplication of the negative pulses of the clock with the positive voltage output of inverter 16 which is generated when $V_1 < V_2$ results in a series of negative voltage pulses synchronized with the output of even-number shift register 3b.

The foregoing description shows only preferred embodiments of the present invention. Various modifications are apparent to those skilled in the art without departing from the scope of the present invention which is only limited by the appended claims.

What is claimed is:

1. A difference voltage canceller for a charge transfer device having a photosensor divided into odd- and even-numbered photosensitive elements, a first shift register connected to the odd-numbered photosensitive elements, and a second shift register connected to the even-numbered photosensitive elements, comprising:
   means for generating bipolar clock pulses for driving said first and second shift registers;
   detector means for generating a difference voltage representative of a difference between first and second offset voltages generated respectively by said first and second shift registers;
   multiplier means for multiplying said difference voltage with said bipolar clock pulses;
   filter means for smoothing a voltage output of said multiplier means; and
   means for combining a voltage output of said filter means with one of the output signals of said first and second shift registers depending on the polarity of the voltage output of said filter means so that the difference between said offset voltages substantially reduces to zero.

2. A difference voltage canceller for a transfer device having a photosensor divided into odd- and even-numbered photosensitive elements, a first shift register connected to the odd-numbered photosensitive elements, and a second shift register connected to the even-numbered photosensitive elements, comprising:
   means for generating bipolar clock pulses for driving said first and second shift registers;
   multiplexer means for multiplexing the output signals of said shift registers;
   detector means responsive to an output signal from said multiplexer means for generating therefrom a difference voltage representative of a difference between first and second offset voltages generated respectively by said first and second shift registers;
   multiplier means for multiplying said difference voltage with said bipolar clock pulses;
   filter means for smoothing a voltage output of said multiplier means; and
   means for combining a voltage output of said filter means with one of the output signals of said first and second shift registers depending on the polarity of the voltage output of said filter means so that the difference between said offset voltages substantially reduces to zero.

3. A difference voltage canceller as claimed in claim 2, wherein said detector means comprises band-pass filter means having a frequency band centered at the repetition frequency of said clock pulses.

4. A difference voltage canceller as claimed in claim 2, wherein said detector means comprises:
   delay means for delaying an output signal of said multiplexer means by one pixel interval; and
   subtractor means for generating said difference voltage from the outputs of said delay means and said multiplexer means.

5. A difference voltage canceller as claimed in claim 2, wherein said combining means comprises:
   inverter means for inverting the polarity of the voltage output of said filter means;
   first and second diodes connected respectively to the outputs of said inverter means and said filter means for passing voltages of specified polarity;
   means for subtractively combining the voltage passed through said first diode with the output voltage of said first shift register; and
   means for subtractively combining the voltage passed through said second diode with the output voltage of said second shift register.

6. A difference voltage canceller for a charge transfer device having a photosensor divided into odd- and even-numbered photosensitive elements, a first shift register connected to the odd-numbered photosensitive elements, a second shift register connected to the even-numbered photosensitive elements, and a multiplexer for multiplexing output signals from said first and second shift registers, comprising:
   means for generating bipolar clock pulses for driving said first and second shift registers;
   detector means responsive to an output signal from said multiplexer for generating therefrom a difference voltage representative of a difference between first and second offset voltages generated respectively by said first and second shift registers;
   multiplier means for multiplying said difference voltage with said bipolar clock pulses;
   filter means for smoothing a voltage output of said multiplier means; and
   means for combining a voltage output of said filter means with one of the output signals of said first and second shift registers depending on the polarity of the voltage output of said filter means so that the difference between said offset voltages substantially reduces to zero.

7. A difference voltage canceller as claimed in claim 6, wherein said detector means comprises band-pass filter means having a frequency band centered at the repetition frequency of said clock pulses.

8. A difference voltage canceller as claimed in claim 6, wherein said combining means comprises:
   inverter means for inverting the polarity of the voltage output of said filter means;
   second multiplier means for multiplying the voltage output of said filter means with said bipolar clock pulses;
   a diode connected to the output of said second multiplier means for passing a voltage of specified polarity; and
   means for subtractively combining the voltage passed through said diode with the output voltage of said multiplexer means.

9. An image sensing apparatus comprising:
   a charge transfer device having a photosensor divided into odd- and even-numbered photosensitive elements, a first shift register connected to the odd-numbered photosensitive elements, and a second shift register connected to the even-numbered photosensitive elements;
   means for generating bipolar clock pulses for driving said first and second shift registers;
   detector means for generating a difference voltage representative of a difference between first and second offset voltages generated respectively by said first and second shift registers;
   multiplier means for multiplying said difference voltage with said bipolar clock pulses;
   filter means for smoothing a voltage output of said multiplier means; and
   means for combining a voltage output of said filter means with one of the output signals of said first and second shift registers depending on the polarity of the voltage output of said filter means so that the difference between said offset voltages substantially reduces to zero.

10. An image sensing apparatus as claimed in claim 9, wherein said detector means comprises:
    multiplexer means for multiplexing the output signals of said shift registers; and
    band-pass filter means connected to said multiplexer means, said band-pass filter means having a frequency band centered at the repetition frequency of said clock pulses.

11. An image sensing apparatus comprising:
    a charge transfer device having a photosensor divided into odd- and even-numbered photosensitive elements, a first shift register connected to the odd-numbered photosensitive elements, and a second shift register connected to the even-numbered photosensitive elements;
    means for generating bipolar clock pulses for driving said first and second shift registers;
    multiplexer means for multiplexing the output signals of said shift registers;
    detector means responsive to an output signal from said multiplexer means for generating therefrom a difference voltage representative of a difference between first and second offset voltages generated respectively by said first and second shift registers;
    multiplier means for multiplying said difference voltage with said bipolar clock pulses;
    filter means for smoothing a voltage output of said multiplier means; and
    means for combining a voltage output of said filter means with one of the output signals of said first and second shift registers depending on the polarity of the voltage output of said filter means so that the difference between said offset voltages substantially reduces to zero.

12. An image sensing apparatus as claimed in claim 11, wherein said detector means comprises band-pass filter means having a frequency band centered at the repetition frequency of said clock pulses.

13. An image sensing apparatus as claimed in claim 11, wherein said detector means comprises:
    delay means for delaying an output signal of said multiplexer means by one pixel interval; and
    subtractor means for generating said difference voltage from the outputs of said delay means and said multiplexer means.

14. An image sensing apparatus as claimed in claim 11, wherein said combining means comprises:
    inverter means for inverting the polarity of the voltage output of said filter means;
    first and second diodes connected respectively to the outputs of said inverter means and said filter means for passing voltages of specified polarity;
    means for subtractively combining the voltage passed through said first diode with the output voltage of said first shift register; and
    means for subtractively combining the voltage passed through said second diode with the output voltage of said second shift register.

15. An image sensing apparatus comprising:
    a charge transfer device having a photosensor divided into odd- and even-numbered photosensitive elements, a first shift register connected to the odd-numbered photosensitive elements, a second shift register connected to the even-numbered photosensitive elements, and a multiplexer for multiplexing output signals from said first and second shift registers;
    means for generating bipolar clock pulses for driving said first and second shift registers;
    detector means responsive to an output signal from said multiplexer for generating therefrom a difference voltage representative of a difference between first and second offset voltages generated respectively by said first and second shift registers;
    multiplier means for multiplying said difference voltage with said bipolar clock pulses;
    filter means for smoothing a voltage output of said multiplier means; and
    means for combining a voltage output of said filter means with one of the output signals of said first and second shift registers depending on the polarity of the voltage output of said filter means so that the difference between said offset voltages substantially reduces to zero.

16. An image sensing apparatus as claimed in claim 15, wherein said detector means comprises band-pass filter means having a frequency band centered at the repetition frequency of said clock pulses.

17. An image sensing apparatus as claimed in claim 15, wherein said combining means comprises:
    inverter means for inverting the polarity of the voltage output of said filter means;
    second multiplier means for multiplying the voltage output of said filter means with said bipolar clock pulses;
    a diode connected to the output of said second multiplier means for passing a voltage of specified polarity; and means for subtractively combining the voltage passed through said diode with the output voltage of said multiplexer means.

18. A method for cancelling the difference between offset voltages generated by first and second shift registers of a charge transfer device, said first and second shift registers being coupled respectively to odd- and even-numbered photosensitive resolution elements, comprising the steps of:

(a) generating bipolar clock pulses and driving said first and second shift registers with the clock pulses to transfer charges photogenerated by said resolution elements along said first and second shift registers;

(b) generating a difference voltage representing the difference between said offset voltages;

(c) multiplying said difference voltage with the bipolar clock pulses to produce a varying voltage of a particular polarity depending on the relative value of said offset voltages;

(d) low-pass filtering said varying voltage; and (e) combining the low-pass filtered voltage of appropriate polarity with one of output voltages from said first and second shift registers so that the difference between said offset voltages substantially reduces to zero.

* * * * *

UNITED STATES PATENT AND TRADEMARK OFFICE
CERTIFICATE OF CORRECTION

PATENT NO. : 5,025,318

DATED : June 18, 1991

INVENTOR(S) : Riichi NAGURA

It is certified that error appears in the above-identified patent and that said Letters Patent is hereby corrected as shown below:

Col. 1, lines 23 and 24, delete "In addition to the attenuation problem" and insert --However--;

Col. 1, line 41, delete "chopped" and insert --superimposed on the video signal--;

Col. 1, line 50, after "of", insert --an analog-to-digital converter of--.

Col. 2, line 13, delete "nonlinear" and insert --staggered--.

Col. 3, line 29, delete "higher" and insert --lower--;

Col. 3, line 30, delete "lower" and insert --higher--.

Col. 4, line 13, delete "amplifier" and insert --amplitude--.

UNITED STATES PATENT AND TRADEMARK OFFICE
CERTIFICATE OF CORRECTION

PATENT NO. : 5,025,318

DATED : June 18, 1991

INVENTOR(S) : Riichi Nagura

It is certified that error appears in the above-indentified patent and that said Letters Patent is hereby corrected as shown below:

Col. 5, line 61, before "transfer", insert --charge--.

Signed and Sealed this

Nineteenth Day of April, 1994

*Attest:*

BRUCE LEHMAN

*Attesting Officer*  *Commissioner of Patents and Trademarks*